United States Patent [19]
Goldberg

[11] Patent Number: 5,327,581
[45] Date of Patent: Jul. 5, 1994

[54] METHOD AND APPARATUS FOR MAINTAINING SYNCHRONIZATION IN A SIMULCAST SYSTEM

[75] Inventor: Steven J. Goldberg, Coral Springs, Fla.

[73] Assignee: Motorola, Inc., Schaumburg, Ill.

[21] Appl. No.: 890,974

[22] Filed: May 29, 1992

[51] Int. Cl.⁵ .................... H04B 7/24; H04L 7/00
[52] U.S. Cl. .................... 455/51.2; 455/56.1; 455/67.1; 370/108; 375/107
[58] Field of Search .............. 455/51.1, 51.2, 53.1, 455/54.1, 56.1, 67.1, 57.1, 67.6; 370/103, 108; 375/107, 112, 114

[56] References Cited

U.S. PATENT DOCUMENTS

| | | | |
|---|---|---|---|
| 4,696,051 | 9/1987 | Breeden | 455/51.2 X |
| 4,696,052 | 9/1987 | Breeden | 455/51.2 |
| 4,718,109 | 1/1988 | Breeden et al. | 455/51.1 |
| 4,721,955 | 1/1988 | Dunkerton et al. | 340/825.47 |
| 5,014,344 | 5/1991 | Goldberg | 455/51.2 |
| 5,128,971 | 7/1992 | Johnson | 375/107 |
| 5,201,061 | 4/1993 | Goldberg et al. | 455/51.2 |
| 5,239,672 | 8/1993 | Kurby et al. | 455/51.2 X |

FOREIGN PATENT DOCUMENTS

0197556  4/1986  European Pat. Off. .
0198448  4/1986  European Pat. Off. .

*Primary Examiner*—Edward F. Urban
*Assistant Examiner*—Chi Pham
*Attorney, Agent, or Firm*—Keith A. Chanroo; Thomas G. Berry

[57] ABSTRACT

A simulcast system (FIG. 16) capable of synchronizing and maintaining synchronization of a plurality of base sites (1602, 1604, 1606, 1608) is coupled to a transmitter controller (226). The plurality of base sites (1602, 1604, 1606, 1608) is capable of transmitting data as radio frequency transmission at substantially the same time. A generator (1808) generates time marks (1708) at a predetermined time period (T). A data divider (1812) divides data into predetermined packets to be interposed between at least a pair of time marks. The data packets (1704) and time marks (1708) are transmitted to the plurality of base sites (1602, 1604, 1606, 1608). The plurality of base sites (1602, 1604, 1606, 1608) includes base site receivers (1603, 1605, 1607, 1607) for receiving the data packets (1704) and time marks (1708) and clocks (1611, 1613, 1615, 1617) for measuring the time (T) between each pair of time marks. Base sites controller (1612, 1614, 1616, 1618) determine when there are variations in time between any pair of time marks and the predetermined time period (T). Timers adjust the delay time at each of the plurality of base sites (1602, 1604, 1606, 1608) in response to variation in time between time marks at the corresponding base site, and delay retransmission of data from the receipt of a start command (1706) by a predetermined delay time determined for each of the plurality of base sites to enable the retransmission of data at substantially the same time by the plurality of base sites (1602, 1604, 1606, 1608).

17 Claims, 10 Drawing Sheets

METHOD AND APPARATUS FOR MAINTAINING SYNCHRONIZATION IN A SIMULCAST SYSTEM

FIELD OF THE INVENTION

This invention relates in general to simulcast transmission systems, and more particularly to a method and apparatus for maintaining synchronization in a simulcast transmission system.

BACKGROUND OF THE INVENTION

A number of methods have been proposed or are in use today for automatically synchronizing the message transmissions of transmitters utilized in simulcast transmission systems. These methods of synchronizing the plurality of transmitters require a substantial amount of time to complete a propagation delay measurement sequence. For a large simulcast transmission system, such as one having forty transmitters, delay measurement times of forty seconds and more were typical when each transmitter was sequentially accessed for measuring the individual transmitter propagation delay. One method of reducing the synchronization time is to divide the simulcast system into the smaller transmission regions, the delays were then simultaneously measured for regional transmitters in alternate transmission regions thereby reducing the total time required to synchronize transmissions within the system. This method of measurement of the transmitter delays, although it speeded up the delay measurement process, presented a new set of problems for measuring the delays required to synchronize the transmitters in adjacent transmission regions.

Generally, to synchronize simulcast transmitters, the propagation delay times must be measured for the plurality of transmitters in order to account for difference in propagation delays. Once synchronization is achieved, the synchronization must continually be maintained because of oscillator drift. Incorporating high accuracy clocks in the plurality of transmitters is an expensive option that requires a substantial amount of air time to be devoted to periodic resynchronizing the plurality of clocks located at each of the transmitters to ensure that the clocks are accurately synchronized for the simulcast transmission of the data.

Thus, what is needed is a method and apparatus for maintaining the synchronization of the plurality of transmitters in a simulcast transmission system that is cost effective and does not require a substantial amount of air-time to be devoted to maintaining synchronization periodically.

SUMMARY OF THE INVENTION

A simulcast system has a transmitter controller capable of synchronizing and maintaining synchronization of a plurality of base sites coupled to the transmitter controller. The plurality of base sites have transmitters capable of transmitting data as radio frequency transmissions at substantially the same time. The transmitter controller further comprises a generator for generating time marks at a predetermined time period. A data divider divides the data into predetermined packets to be interposed between at least a pair of time marks. The transmitter controller transmits the data packets and time marks to the plurality of base sites. The plurality of base sites include base site receivers for receiving the data packets and time marks and clocks for measuring the time between pairs of time marks. Base sites controller determines when there are variations in time between any pairs of time marks and the predetermined time period. Timers adjust the delay time at each of the plurality of base sites in response to variation in time between time marks at the corresponding base site, and delay retransmission of data from the receipt of a start command by a predetermined delay time determined for each of the plurality of base sites to enable the retransmission of data at substantially the same time by the plurality of base sites.

A method for maintaining synchronization of data transmissions in a simulcast system, the simulcast system having a transmitter controller capable of synchronizing and maintaining synchronization of a plurality of base sites coupled to the transmitter controller, the plurality of base sites having transmitters capable of transmitting data as radio frequency transmissions at substantially the same time, the method comprises the steps of:

(a) generating time marks at a predetermined time period;

(b) dividing the data into predetermined packets to be interposed between at least a pair of time marks;

(c) transmitting the data packets and time marks to the plurality of base sites;

(d) periodically transmitting the data packets including the time marks to the plurality of base sites for determining variations in time to the plurality of base sites;

(e) receiving the data packets and time marks by the plurality of base sites;

(f) measuring the time between consecutive pairs of time marks;

(g) determining when there are variations in time between any pairs of time mark and the predetermined time period; and (h) adjusting the difference in propagation delay of the respective base sites responsive to step (g) to compensate for variations in the propagation delays to the plurality of base sites.

DESCRIPTION OF A PREFERRED EMBODIMENT

Figure 1:
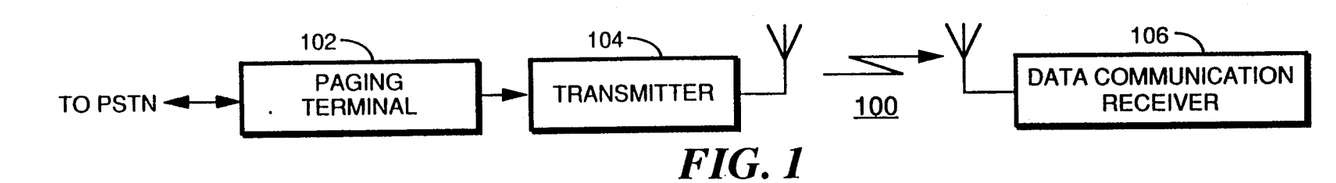
FIG. 1 is an electrical block diagram of a data transmission system in accordance with the preferred embodiment of the present invention.

FIG. 1 is an electrical block diagram of a data transmission system 100, such as a paging system, in accordance with the preferred embodiment of the present invention. In such a data transmission system 100, messages originating either from a phone, as in a system providing numeric data transmission, or from a message entry device, such as an alphanumeric data terminal, are routed through the public switched telephone network (PSTN) to a paging terminal 102 which processes the numeric or alphanumeric message information for transmission by one or more transmitters 104 provided within the system. When multiple transmitters are utilized, the transmitters 104, preferably in simulcast, transmit the message information to data communication receivers 106. Processing of the numeric and alphanumeric information by the paging terminal 102 and the protocol utilized for the transmission of the messages is described below.

Figure 2:
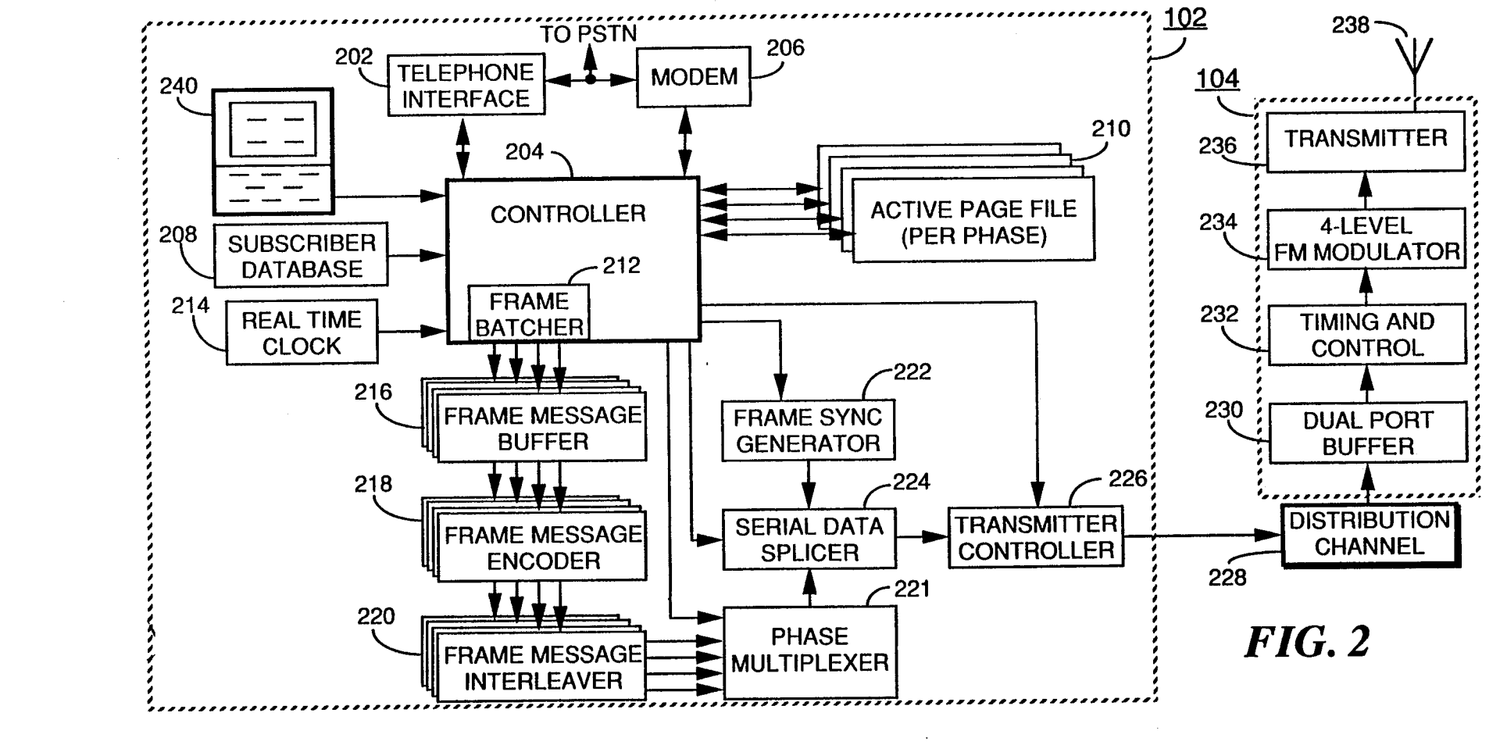
FIG. 2 is an electrical block diagram of a terminal for processing and transmitting message information in accordance with the preferred embodiment of the present invention.

FIG. 2 is an electrical block diagram of the paging terminal 102 utilized for processing and controlling the transmission of the message information in accordance with the preferred embodiment of the present invention. Short messages, such as tone-only and numeric messages which can be readily entered using a Touch-Tone telephone, are coupled to the paging terminal 102 through a telephone interface 202 in a manner well known in the art. Longer messages, such as alphanumeric messages which require the use of a data entry device, are coupled to the paging terminal 102 through a modem 206 using any of a number of well known modem transmission protocols. When a call to place a message is received, a controller 204 handles the processing of the message. The controller 204 is preferably a microcomputer, such as an MC68000 or equivalent, which is manufactured by Motorola Inc., and which runs various pre-programmed routines for controlling such terminal operations as voice prompts to direct the caller to enter the message, or the handshaking protocol to enable reception of messages from a data entry device. When a call is received, the controller 204 references information stored in the subscriber database 208 to determine how the message being received is to be processed. The subscriber database 208 includes, but is not limited to, such information as addresses assigned to the data communication receiver, message type associated with the address, and information related to the status of the data communication receiver, such as active or inactive for failure to pay the service charges. A data entry terminal 240 is provided which couples to the controller 204, and which is used for such purposes as entry, updating and deleting of information stored in the subscriber database 208, for monitoring system performance, and for obtaining such information as service charge information.

The subscriber database 208 also includes such information as to what transmission frame and to what transmission phase the data communication receiver is assigned, as will be described in further detail below. The receiver message is stored in an active page file 210 which stores the messages in queues according to the transmission phase assigned to the data communication receiver. In the preferred embodiment of the present invention, four phase queues are provided in the active page file 210. The active page file 210 is preferably a dual port, first in first out random access memory, although it will be appreciated that other random access memory devices, such as hard disk drives, can be utilized as well. Periodically, the message information stored in each of the phase queues is recovered from the active page file 210 under control of controller 204 using timing information such as provided by a real time clock 214, or other suitable timing source. The recovered message information from each phase queue is sorted by frame number and is then organized by address, message information, and any other information required for transmission, and then batched into frames based upon message size by frame batching controller 212. The batched frame information for each phase queue is coupled to frame message buffers 216 which temporarily store the batched frame information until a time for further processing and transmission. Frames are batched in numeric sequence, so that while a current frame is being transmitted, the next frame to be transmitted is in the frame message buffer 216, and the next frame thereafter is being retrieved and batched. At the appropriate time, the batched frame information stored in the frame message buffer 216 is transferred to the frame encoder 218, again maintaining the phase queue relationship. The frame encoder 218 encodes the address and message information into address and message code words required for transmission, as will be described below. The encoded address and message code words are ordered into blocks and then coupled to a block interleaver 220 which interleaves preferably eight code words at a time for transmission in a manner well known in the art. The interleaved code words from each block interleaver 220 are then serially transferred to a phase multiplexer 221, which multiplexes the message information on a bit by bit basis into a serial data stream by transmission phase. The controller 204 next enables a frame sync generator 222 which generates the synchronization code which is transmitted at the start of each frame transmission. The synchronization code is multiplexed with address and message information under the control of controller 204 by serial data splicer 224, and generates therefrom a message stream which is properly formatted for transmission. The message stream is next coupled to a transmitter controller 226, which under the control of controller 204 transmits the message stream over a distribution channel 228. The distribution channel 228 may be any of a number of well known distribution channel types, such as wire line, an RF or microwave distribution channel, or a satellite distribution link. The distributed message stream is transferred to one or more transmitter stations 104, depending upon the size of the communication system. The message stream is first transferred into a dual port buffer 230 which temporarily stores the message stream prior to transmission. At an appropriate time determined by timing and control circuit 232, the message stream is recovered from the dual port buffer 230 and coupled to the input of preferably a 4-level FSK modulator 234. The modulated message stream is then coupled to the transmitter 236 for transmission via antenna 238.

Figure 3:
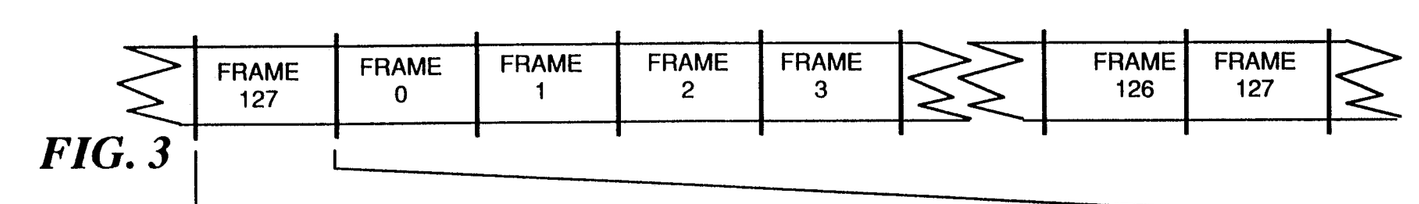
FIGS. 3–5 are timing diagrams illustrating the transmission format of the signaling protocol utilized in accordance with the preferred embodiment of the present invention.
Figure 4:
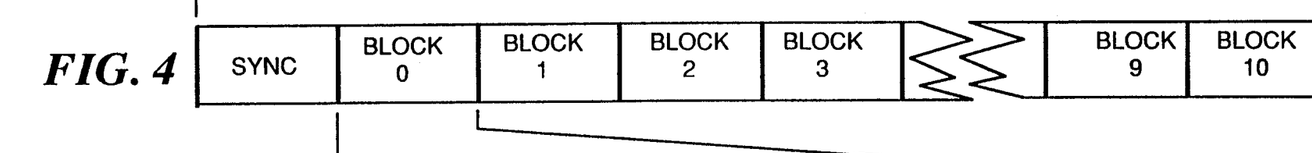
Figure 5:
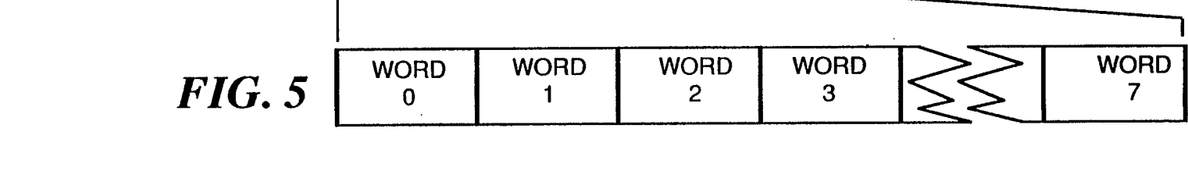

FIGS. 3, 4 and 5 are timing diagrams illustrating the transmission format of the signaling protocol utilized in accordance with the preferred embodiment of the present invention. As shown in FIG. 3, the signaling protocol enables message transmission to data communication receivers, such as pagers, assigned to one or more of 128 frames which are labeled frame 0 through frame 127. It then will be appreciated that the actual number of frames provided within the signaling protocol can be greater or less than described above. The greater the number of frames utilized, the greater the battery life that may be provided to the data communication receivers operating within the system. The fewer the number of frames utilized, the more often messages can be queued and delivered to the data communication receivers assigned to any particular frame, thereby reducing the latency, or time required to deliver messages.

As shown in FIG. 4, the frames comprise a synchronization code (sync) followed preferably by eleven blocks of message information which are labeled block 0 through block 10. As shown in FIG. 5, each block of message information comprises preferably eight address, control or data code words which are labeled word 0 through word 7 for each phase. Consequently, each phase in a frame allows the transmission of up to eighty-eight address, control and data code words. The address, control and data code words are preferably 31,21 BCH code words with an added thirty-second even parity bit which provides an extra bit of distance to the code word set. It will be appreciated that other code words, such as a 23,12 Golay code word, could be utilized as well. Unlike the well known POCSAG signaling protocol which provides address and data code words that utilize the first code word bit to define the code word type, as either address or data, no such distinction is provided for the address and data code words in the signaling protocol utilized with the preferred embodiment of the present invention. Rather, address and data code words are defined by their position within the individual frames.

Figure 6:
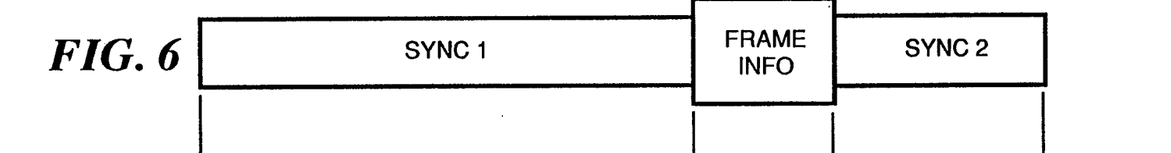
FIGS. 6 and 7 are timing diagrams illustrating the synchronization signals utilized in accordance with the preferred embodiment of the present invention.
Figure 7:
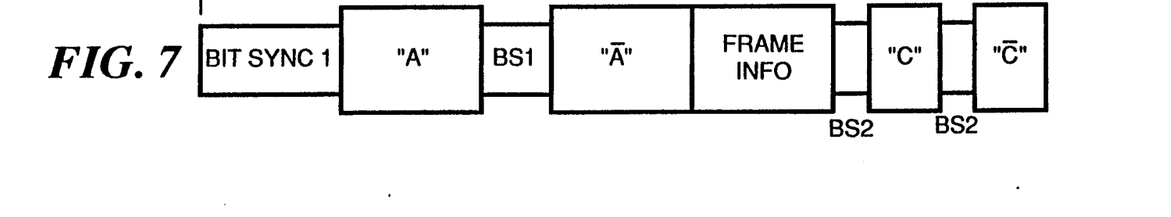

FIGS. 6 and 7 are timing diagrams illustrating the synchronization code utilized in accordance with the preferred embodiment of the present invention. In particular, as shown in FIG. 6, the synchronization code comprises preferably three parts, a first synchronization code (sync 1), a frame information code word (frame info) and a second synchronization code (sync 2). As shown in FIG. 7, the first synchronization code comprises first and third portions, labeled bit sync 1 and BS1, which are alternating 1,0 bit patterns which provides bit synchronization, and second and fourth portions, labeled "A" and its complement "A bar", which provide frame synchronization. The second and fourth portions are preferably single 32,21 BCH code words which are predefined to provide high code word correlation reliability, and which are also used to indicate the data bit rate at which addresses and messages are transmitted. The table below defines the data bit rates which are used in conjunction with the signaling protocol.

| Bit Rate | "A" Value |
| --- | --- |
| 1600 bps | A1 and A1 bar |
| 3200 bps | A2 and A2 bar |
| 6400 bps | A3 and A3 bar |
| Not defined | A4 and A4 bar |

As shown in the table above, three data bit rates are predefined for address and message transmission, although it will be appreciated that more or less data bit rates can be predefined as well, depending upon the system requirements. A fourth "A" value is also predefined for future use.

The frame information code word is preferably a single 32,21 BCH code word which includes within the data portion a predetermined number of bits reserved to identify the frame number, such as 7 bits encoded to define frame number 0 to frame number 127.

The structure of the second synchronization code is preferably similar to that of the first synchronization code described above. However, unlike the first synchronization code which is preferably transmitted at a fixed data symbol rate, such as 1600 bps (bits per second), the second synchronization code is transmitted at the data symbol rate at which the address and messages are to be transmitted in any given frame. Consequently, the second synchronization code allows the data communication receiver to obtain "fine" bit and frame synchronization at the frame transmission data bit rate.

In summary, the signaling protocol utilized with the preferred embodiment of the present invention comprises 128 frames which include a predetermined synchronization code followed by eleven data blocks which comprise eight address, control or message code words per phase. The synchronization code enables identification of the data transmission rate, and insures synchronization by the data communication receiver with the data code words transmitted at the various transmission rates.

Figure 8:
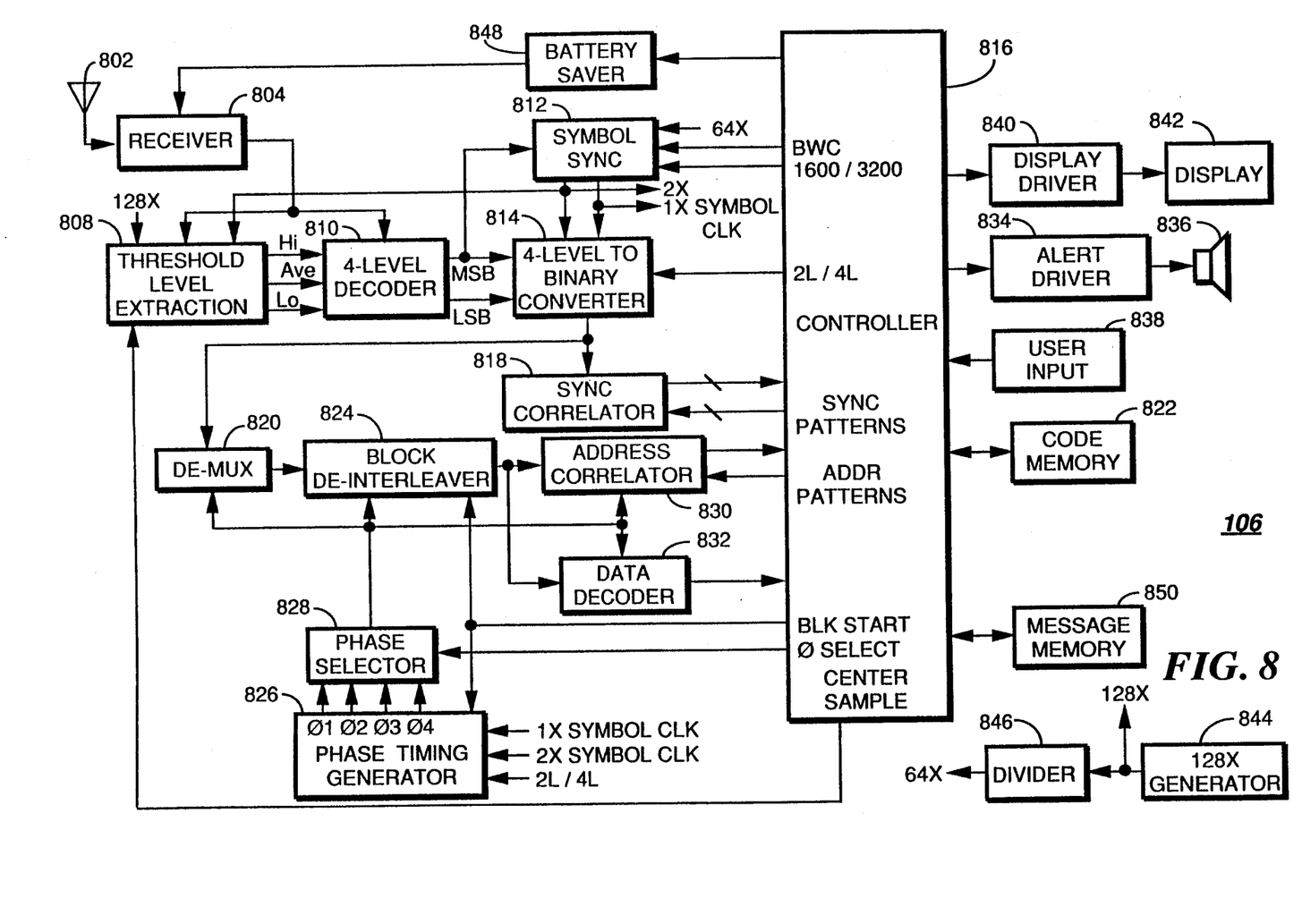
FIG. 8 is an electrical block diagram of a data communication receiver in accordance with the preferred embodiment of the present invention.

FIG. 8 is an electrical block diagram of the data communication receiver 106 in accordance with the preferred embodiment of the present invention. The heart of the data communication receiver 106 is a controller 816, which is preferably implemented using an MC68HC05HC11 microcomputer, such as manufactured by Motorola, Inc. The microcomputer controller, hereinafter call the controller 816, receives and processes inputs from a number of peripheral circuits, as shown in FIG. 8, and controls the operation and interaction of the peripheral circuits achieved by using software subroutines. The use of a microcomputer controller for processing and control functions is well known to one of ordinary skill in the art.

Figure 9:
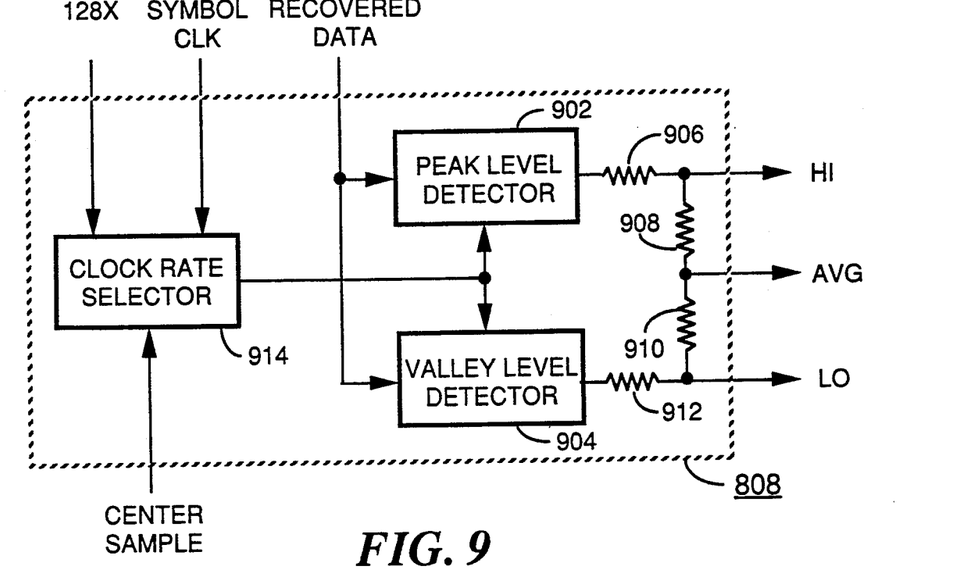
FIG. 9 is an electrical block diagram of a threshold level extraction circuit utilized in the data communication receiver of FIG. 8.

The data communication receiver 106 is capable of receiving address, control and message information, hereafter called "data" which is modulated using preferably 2-level and 4-level frequency modulation techniques. The transmitted data is intercepted by an antenna 802 which couples to the input of a receiver section 804. Receiver section 804 processes the received data in a manner well known in the art, providing at the output an analog 4-level recovered data signal, hereafter called a recovered data signal. The recovered data signal is coupled to one input of a threshold level extraction circuit 808, and to an input of a 4-level decoder 810. The threshold level extraction circuit 808 is best understood by referring to FIG. 9, and as shown, comprises two clocked level detector circuits 902, 904 which have as inputs the recovered data signal. Level detector 902 detects the peak signal amplitude value and provides a high peak threshold signal which is proportional to the detected peak signal amplitude value, while level detector 904 detects the valley signal amplitude value and provides a valley threshold signal which is proportional to the detected valley signal amplitude value of the recovered data signal. The level detector 902, 904 signal outputs are coupled to terminals of resistors 906, 912, respectively. The opposite resistor terminals 906, 912 provide the high threshold output signal (Hi), and the low threshold output signal (Lo) respectively. The opposite resistor terminals 906, 912 are also coupled to terminals of resistors 908, 910, respectively. The opposite resistor 908, 910 terminals are coupled together to form a resistive divider which provides an average threshold output signal (Avg) which is proportional to the average value of the recovered data signal. Resistors 906, 912 have resistor values preferably of 1R, while resistors 908, 910 have resistor values preferably of 2R, realizing threshold output signal values of 17%, 50% and 83%, and which are utilized to enable decoding the 4-level data signals as will be described below.

When power is initially applied to the receiver portion, as when the data communication receiver is first turned on, a clock rate selector 914 is preset through a control input (center sample) to select a 128× clock, i.e. a clock having a frequency equivalent to 128 times the slowest data bit rate, which as described above is 1600 bps. The 128× clock is generated by 128× clock generator 844, as shown in FIG. 8, which is preferably a crystal controlled oscillator operating at 204.8 KHz (kilohertz). The output of the 128× clock generator 844 couples to an input of frequency divider 846 which divides the output frequency by two to generate a 64× clock at 102.4 KHz. Returning to FIG. 9, the 128× clock allows the level detectors 902, 904 to asynchronously detect in a very short period of time the peak and valley signal amplitude values, and to therefore generate the low (Lo), average (Avg) and high (Hi) threshold output signal values required for modulation decoding. After symbol synchronization is achieved with the synchronization signal, as will be described below, the controller 816 generates a second control signal (Center Sample) to enable selection of a 1× symbol clock which is generated by symbol synchronizer 812 as shown in FIG. 8.

Figure 10:
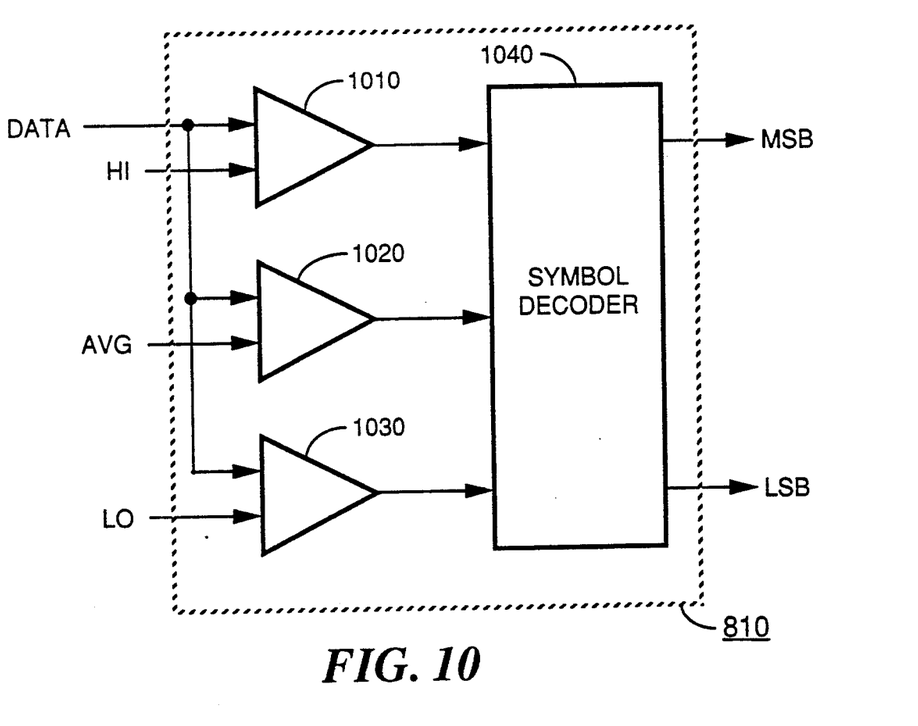
FIG. 10 is an electrical block diagram of a 4-level decoder utilized in the data communication receiver of FIG. 8.

Returning to FIG. 8, the 4-level decoder 810 operation is best understood by referring to FIG. 10. As shown, the 4-level decoder 810 comprises three voltage comparators 1010, 1020, 1030 and a symbol decoder 1040. The recovered data signal couples to an input of the three comparators 1010, 1020, 1030. The high threshold output signal (Hi) couples to the second input of comparator 1010, the average threshold output signal (Avg) couples to the second input of comparator 1020, and the low threshold output signal (Lo) couples to the second input of comparator 1030. The outputs of the three comparators 1010, 1020, 1030 couple to inputs of symbol decoder 1040. The symbol decoder 1040 decodes the inputs according to the table provided below.

| Threshold | | | Output | |
|---|---|---|---|---|
| Hi | Avg | Lo | MSB | LSB |
| $RC_{in}<$ | $RC_{in}<$ | $RC_{in}<$ | 0 | 0 |
| $RC_{in}<$ | $RC_{in}<$ | $RC_{in}>$ | 0 | 1 |
| $RC_{in}<$ | $RC_{in}>$ | $RC_{in}>$ | 1 | 1 |
| $RC_{in}>$ | $RC_{in}>$ | $RC_{in}>$ | 1 | 0 |

As shown in the table above, when the recovered data signal ($RC_{in}$) is less than all three threshold values, the symbol generated is 00 (MSB=0, LSB=0). Thereafter, as each of the three threshold values is exceeded, a different symbol is generated, as shown in the table above.

The MSB output from the 4-level decoder 810 is coupled to an input of the symbol synchronizer 812 and provides a recovered data input generated by detecting the zero crossings in the 4-level recovered data signal. The positive level of the recovered data input represents the two positive deviation excursions of the analog 4-level recovered data signal above the average threshold output signal, and the negative level represents the two negative deviation excursions of the analog 4-level recovered data signal below the average threshold output signal.

Figure 11:
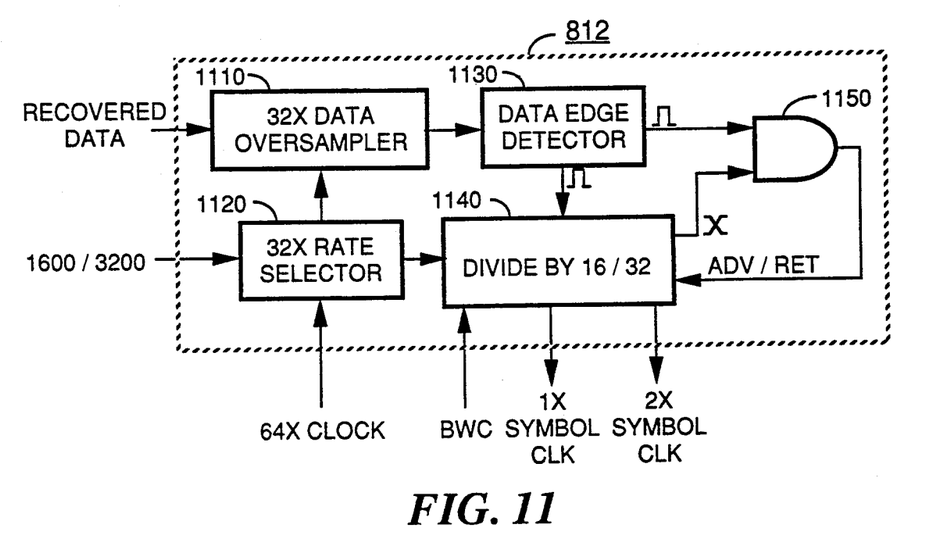
FIG. 11 is an electrical block diagram of a symbol synchronizer utilized in the data communication receiver of FIG. 8.

The operation of the symbol synchronizer 812 is best understood by referring to FIG. 11. The 64× clock at 102.4 KHz which is generated by frequency divider 846 is coupled to an input of a 32× rate selector 1120. The 32× rate selector 1120 is preferably a divider which provides selective division by 1 or 2 to generate a sample clock which is thirty-two times the symbol transmission rate. A control signal (1600/3200) is coupled to a second input of the 32× rate selector 1120, and is used to select the sample clock rate for symbol transmission rates of 1600 and 3200 symbols per second. The selected sample clock is coupled to an input of 32× data oversampler 1110 which samples the recovered data signal (MSB) at thirty-two samples per symbol. The symbol samples are coupled to an input of a data edge detector 1130 which generates an output pulse when a symbol edge is detected. The sample clock is also coupled to an input of a divide-by-16/32 circuit 1140 which is utilized to generate 1× and 2× symbol clocks synchronized to the recovered data signal. The divide-by-16/32 circuit 1140 is preferably an up/down counter. When the data edge detector 1130 detects a symbol edge, a pulse is generated which is gated by AND gate 1150 with the current count of divide-by-16/32 circuit 1140. Concurrently, a pulse is generated by the data edge detector 1130 which is also coupled to an input of the divide-by-16/32 circuit 1140. When the pulse coupled to the input of AND gate 1150 arrives before the generation of a count of thirty-two by the divide-by-16/32 circuit 1140, the output generated by AND gate 1150 causes the count of divide-by-16/32 circuit 1140 to be advanced by one count in response to the pulse which is coupled to the input of divide-by-16/32 circuit 1140 from the data edge detector 1130, and when the pulse coupled to the input of AND gate 1150 arrives after the generation of a count of thirty-two by the divide-by-16/32 circuit 1140, the output generated by AND gate 1150 causes the count of divide-by-16/32 circuit 1140 to be retarded by one count in response to the pulse which is coupled to the input of divide-by-16/32 circuit 1140 from the data edge detector 1130, thereby enabling the synchronization of the 1× and 2× symbol clocks with the recovered data signal. The symbol clock rates generated are best understood from the table below.

| Input Clock (Relative) | Control Input (SPS) | Rate Selector Divide Ratio | Rate Selector Output | 2× Symbol Clock (BPS) | 1× Symbol Clock (BPS) |
|---|---|---|---|---|---|
| 64× | 1600 | by 2 | 32× | 3200 | 1600 |
| 64× | 3200 | by 1 | 64× | 6400 | 3200 |

As shown in the table above, the 1× and 2× symbol clocks are generated at 1600, 3200 and 6400 bits per second and are synchronized with the recovered data signal.

Figure 12:
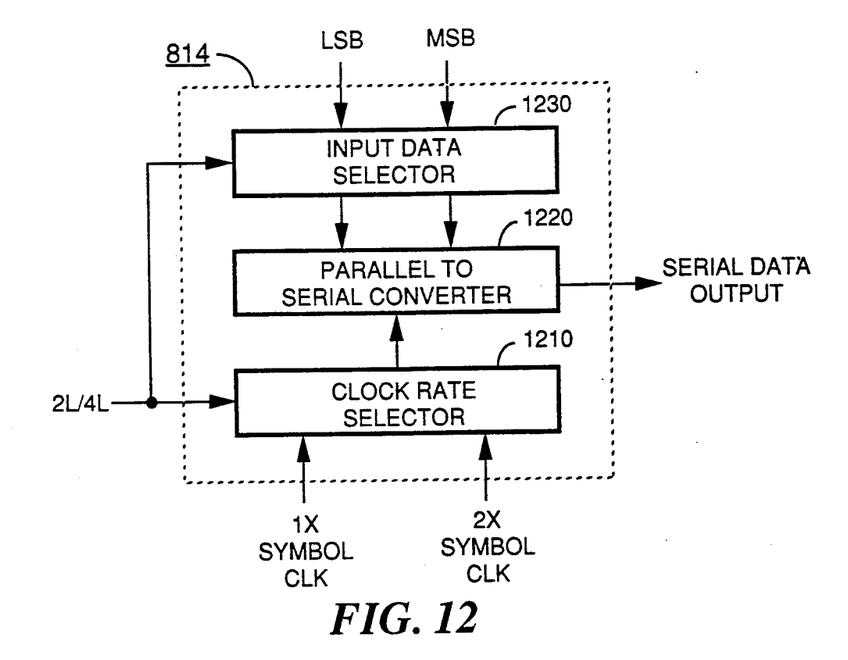
FIG. 12 is an electrical block diagram of a 4-level to binary converter utilized in the data communication receiver of FIG. 8.

The 4-level binary converter 814 is best understood by referring to FIG. 12. The 1× symbol clock is coupled to a first clock input of a clock rate selector 1210. A 2× symbol clock also couples to a second clock input of the clock rate selector 1210. The symbol output signals (MSB, LSB) are coupled to inputs of an input data selector 1230. A selector signal (2L/4L) is coupled to a selector input of the clock rate selector 1210 and the selector input of the input data selector 1230, and provides control of the conversion of the symbol output signals as either 2-level FSK data, or 4-level FSK data. When the 2-level FSK data conversion (2L) is selected, only the MSB output is selected which is coupled to the input of a parallel to serial converter 1220. The 1× clock input is selected by clock rate selector 1210 which results in a single bit binary data stream to be generated at the output of the parallel to serial converter 1220. When the 4-level FSK data conversion (4L) is selected, both the LSB and MSB outputs are selected which are coupled to the inputs of the parallel to serial converter 1220. The 2× clock input is selected by clock rate selector 1210 which results in a serial two bit binary data stream to be generated at 2× the symbol rate, which is provided at the output of the parallel to serial converter 1220.

Returning to FIG. 8, the serial binary data stream generated by the 4-level to binary converter 814 is coupled to inputs of a synchronization word correlator 818 and a demultiplexer 820. The synchronization word correlator is best understood with reference to FIG. 13. Predetermined "A" word synchronization patterns are recovered by the controller 816 from a code memory 822 and are coupled to an "A" word correlator 1310. When the synchronization pattern received matches one of the predetermined "A" word synchronization patterns within an acceptable margin of error, an "A" or "A-bar" output is generated and is coupled to controller 816. The particular "A" or "A-bar" word synchronization pattern correlated provides frame synchronization to the start of the frame ID word, and also defines the data bit rate of the message to follow, as was previously described.

Figure 13:
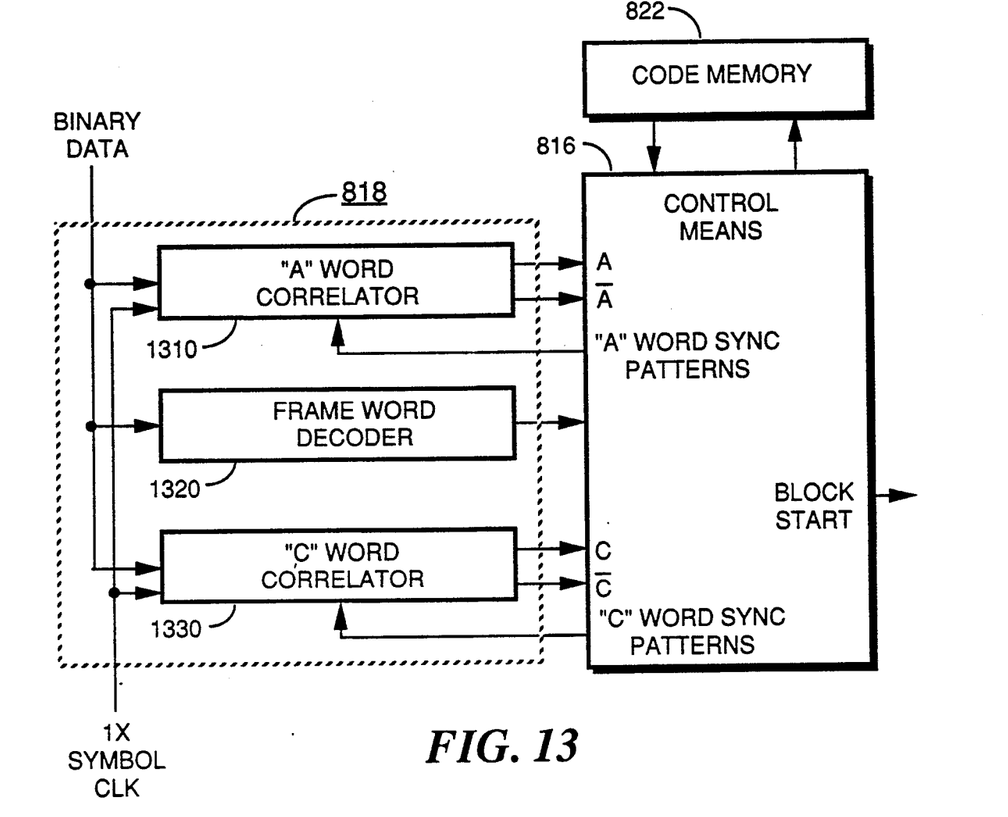
FIG. 13 is an electrical block diagram of a synchronization correlator utilized in the data communication receiver of FIG. 8.

The serial binary data stream is also coupled to an input of the frame word decoder 1320 which decodes the frame word and provides an indication of the frame number currently being received by the controller 816. During sync acquisition, such as following initial receiver turn-on, power is supplied to the receiver portion by battery saver circuit 848, shown in FIG. 8, which enabled the reception of the "A" synchronization word, as described above, and which continues to be supplied to enable processing of the remainder of the synchronization code. The controller 816 compares the frame number currently being received with a list of assigned frame numbers stored in code memory 822. Should the currently received frame number differ from an assigned frame number, the controller 816 generates a battery saving signal which is coupled to an input of battery saver circuit 848, suspending the supply of power to the receiver portion. The supply of power will be suspended until the next frame assigned to the receiver, at which time a battery saver signal is generated by the controller 816 which is coupled to the battery saving circuit 848 to enable the supply of power to the receiver portion to enable reception of the assigned frame.

Returning to the operation of the synchronization correlator shown in FIG. 13, a predetermined "C" word synchronization pattern is recovered by the controller 816 from a code memory 822 and is coupled to a "C" word correlator 1330. When the synchronization pattern received matches the predetermined "C" word synchronization pattern with an acceptable margin of error, a "C" or "C-bar" output is generated which is coupled to controller 816. The particular "C" or "C-bar" synchronization word correlated provides "fine" frame synchronization to the start of the data portion of the frame.

Figure 14:
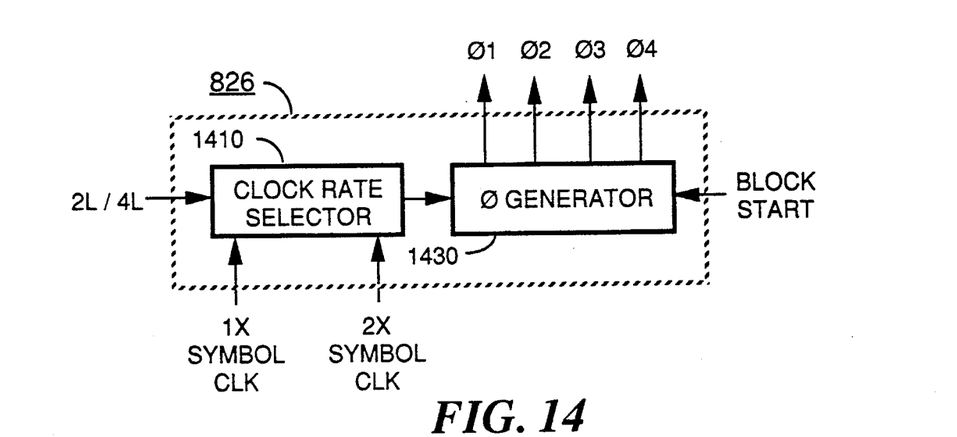
FIG. 14 is an electrical block diagram of a phase timing generator utilized in the data communication receiver of FIG. 8.

Returning to FIG. 8, the start of the actual data portion is established by the controller 816 generating a block start signal (Blk Start) which is coupled to inputs of a word de-interleaver 824 and a data recovery timing circuit 826. The data recovery timing circuit 826 is best understood by referring to FIG. 14. A control signal (2L/4L) is coupled to an input of clock rate selector 1410 which selects either 1X or 2X symbol clock inputs. The selected symbol clock is coupled to the input of a phase generator 1430 which is preferably a clocked ring counter which is clocked to generate four phase output signals ($\phi 1-\phi 4$). A block start signal (BLK START) is also coupled to an input of the phase generator 1430, and is used to hold the ring counter in a predetermined phase until the actual decoding of the message information is to begin. When the block start signal releases the phase generator 1430, the phase generator 1430 begins generating clocked phase signals which are synchronized with the incoming message symbols.

Referring back to FIG. 8, the clocked phase signal outputs are coupled to inputs of a phase selector 828. During operation, the controller 816 recovers from the code memory 822 the transmission phase number to which the data communication receiver is assigned. The phase number is transferred to the phase select output ($\phi$ Select) of the controller 816 and is coupled to an input of phase selector 828. A phase clock, corresponding to the transmission phase assigned, is provided at the output of the phase selector 828 and is coupled to clock inputs of the demultiplexer 820, block de-interleaver 824, and address and data decoders 830 and 832, respectively. The demultiplexer 820 is used to select the binary bits associated with the assigned transmission phase which are then coupled to the input of block de-interleaver 824, and clocked into the de-interleaver array on each corresponding phase clock. The de-interleaver array is an 8×32 bit array which de-interleaves eight interleaved address, control or message code words, corresponding to one transmission block. The de-interleaved address code words are coupled to the input of address correlator 830. The controller 816 recovers the address patterns assigned to the data communication receiver, and couples the patterns to a second input of the address correlator. When any of the de-interleaved address code words matches any of the address patterns assigned to the data communication receiver within an acceptable margin of error, the message information associated with the address is then decoded by the data decoder 832 and stored in a message memory 850 in a manner well known to one of ordinary skill in the art. Following the storage of the message information, a sensible alert signal is generated by the controller 816. The sensible alert signal is preferably an audible alert signal, although it will be appreciated that other sensible alert signals, such as tactile alert signals, and visual alert signals, can be generated as well. The audible alert signal is coupled by the controller 816 to an alert driver 834 which is used to drive an audible alerting device, such as a speaker or a transducer 836. The user can override the alert signal generation through the use of user input controls 838 in a manner well known in the art.

Following the detection of an address associated with the data communication receiver, the message information is coupled to the input of data decoder 832 which decodes the encoded message information into preferably a BCD or ASCII format suitable for storage and subsequent display. The stored message information can be recalled by the user using the user input controls 838 whereupon the controller 816 recovers the message information from memory and provides the message information to a display driver 840 for presentation on a display 842, such as an LCD display.

Figure 15:
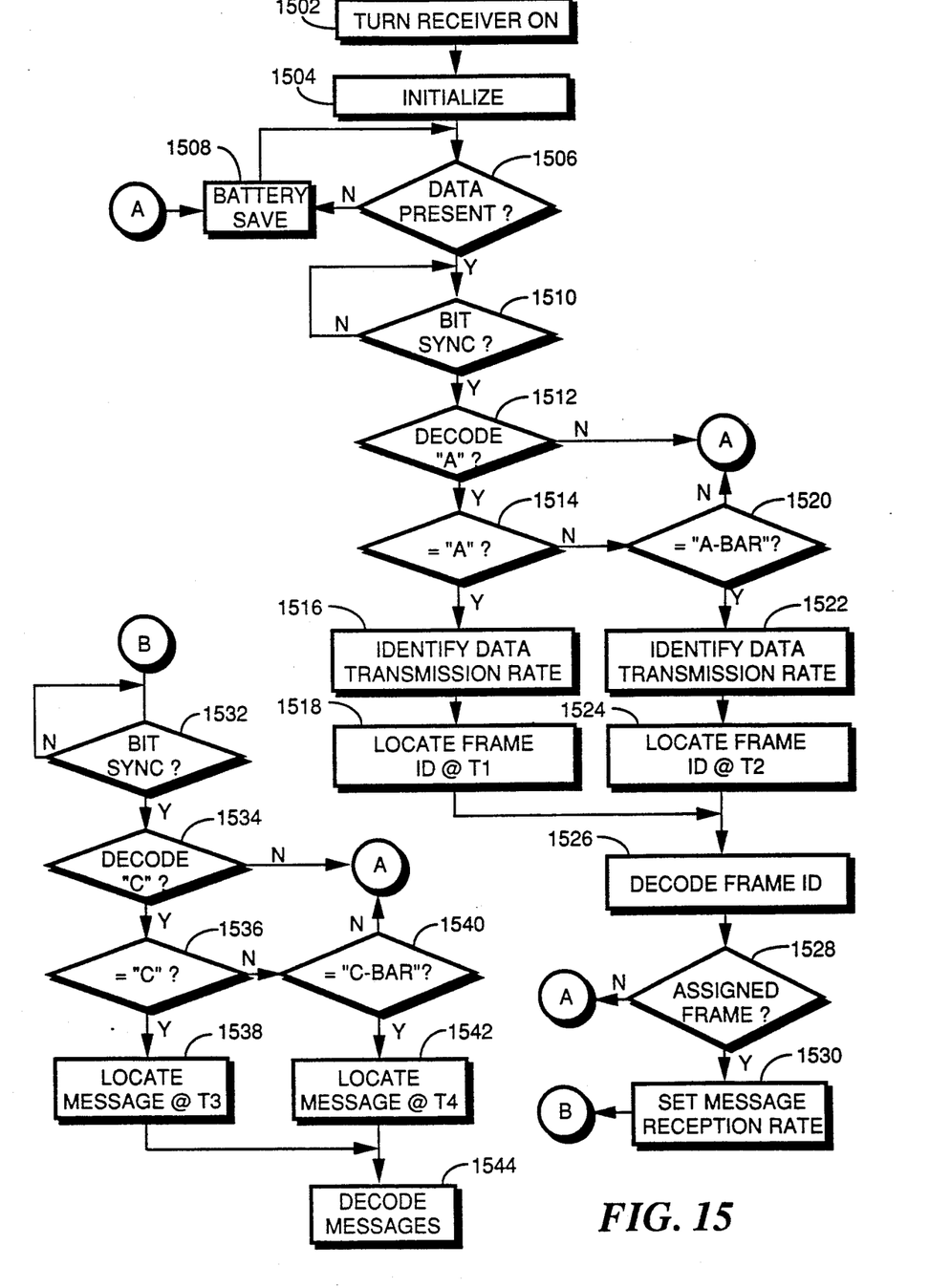
FIG. 15 is a flow diagram illustrating the synchronization correlation sequence in accordance with the preferred embodiment of the present invention.

FIG. 15 is a flow chart describing the operation of the data communication receiver in accordance with the preferred embodiment of the present invention. At step 1502, when the data communication receiver is turned on, the controller operation is initialized, at step 1504. Power is periodically applied to the receiver portion to enable receiving information present on the assigned RF channel. When data is not detected on the channel in a predetermined time period, battery saver operation is resumed, at step 1508. When data is detected on the channel, at step 1506, the synchronization word correlator begins searching for bit synchronization at step 1510. When bit synchronization is obtained, at step 1510, the "A" word correlation begins at step 1512. When the non-complemented "A" word is detected, at step 1514, the message transmission rate is identified as described above, at step 1516, and because frame synchronization is obtained, the time (T1) to the start of the frame identification code word is identified, at step 1518. When the non-complemented "A" word is not detected, at step 1514, indicating the non-complemented "A" word may have been corrupted by a burst error during transmission, a determination is made whether the complemented "A bar" is detected, at step 1520. When the "A bar" word is not detected at step 1512, indicating that the "A-bar" word may also have been corrupted by a burst error during transmission, battery saver operation is again resumed, at step 1508. When the "A-bar" word is detected, at step 1520, the message transmission rate is identified as described above, at step 1522, and because frame synchronization is obtained, the time (T2) to the start of the frame identification code word is identified, at step 1524. At the appropriate time, decoding of the frame identification word occurs, at step 1526. When the frame ID detected is not one assigned to the data communication receiver, at step 1528, battery saving is resumed, at step 1508, and remains so until the next assigned frame is to be received. When the decoded frame ID corresponds to an assigned frame ID, at step 1528, the message reception rate is set, at step 1530. An attempt to bit synchronize at the message transmission rate is next made at step 1532. When bit synchronization is obtained, at step 1533, the "C" word correlation begins at step 1534. When the non-complemented "C" word is detected, at step 1536, frame synchronization is obtained, and the time (T3) to the start of the message information is identified, at step 1538.

When the non-complemented "C" word is not detected, at step 1536, indicating the non-complemented "C" word may have been corrupted by a burst error during transmission, a determination is made whether the complement "C bar" is detected, at step 1540. When the "C bar" word is not detected at step 1540, indicating that the "C-bar" word may also have been corrupted by a burst error during transmission, battery saver operation is again resumed, at step 1508. When the "C-bar" word is detected, at step 1540, frame synchronization is obtained, and the time (T4) to the start of the message information is identified, at step 1542. At the appropriate time, message decoding can begin at step 1544.

In summary, by providing multiple synchronization code words which are spaced in time, the reliability of synchronizing with synchronization information that is subject to burst error corruption is greatly enhanced. The use of a predetermined synchronization code word as the first synchronization code word, and a second predetermined synchronization code word which is the complement of the first predetermined synchronization code word, allow accurate frame synchronization on either the first or the second predetermined synchronization code word. By encoding the synchronization code words, additional information, such as the transmission data rate can be provided, thereby enabling the transmission of message information at several data bit rates. By using a second coded synchronization word pair, "fine" frame synchronization at the actual message transmission rate can be achieved, and as above, due to spacing in time of the synchronization code words, the reliability of synchronizing at a different data bit rate with synchronization information which is subject to burst error corruption is greatly enhanced, thereby improving the reliability of the data communication receiver to receive and present messages to the receiver user.

Figure 16:
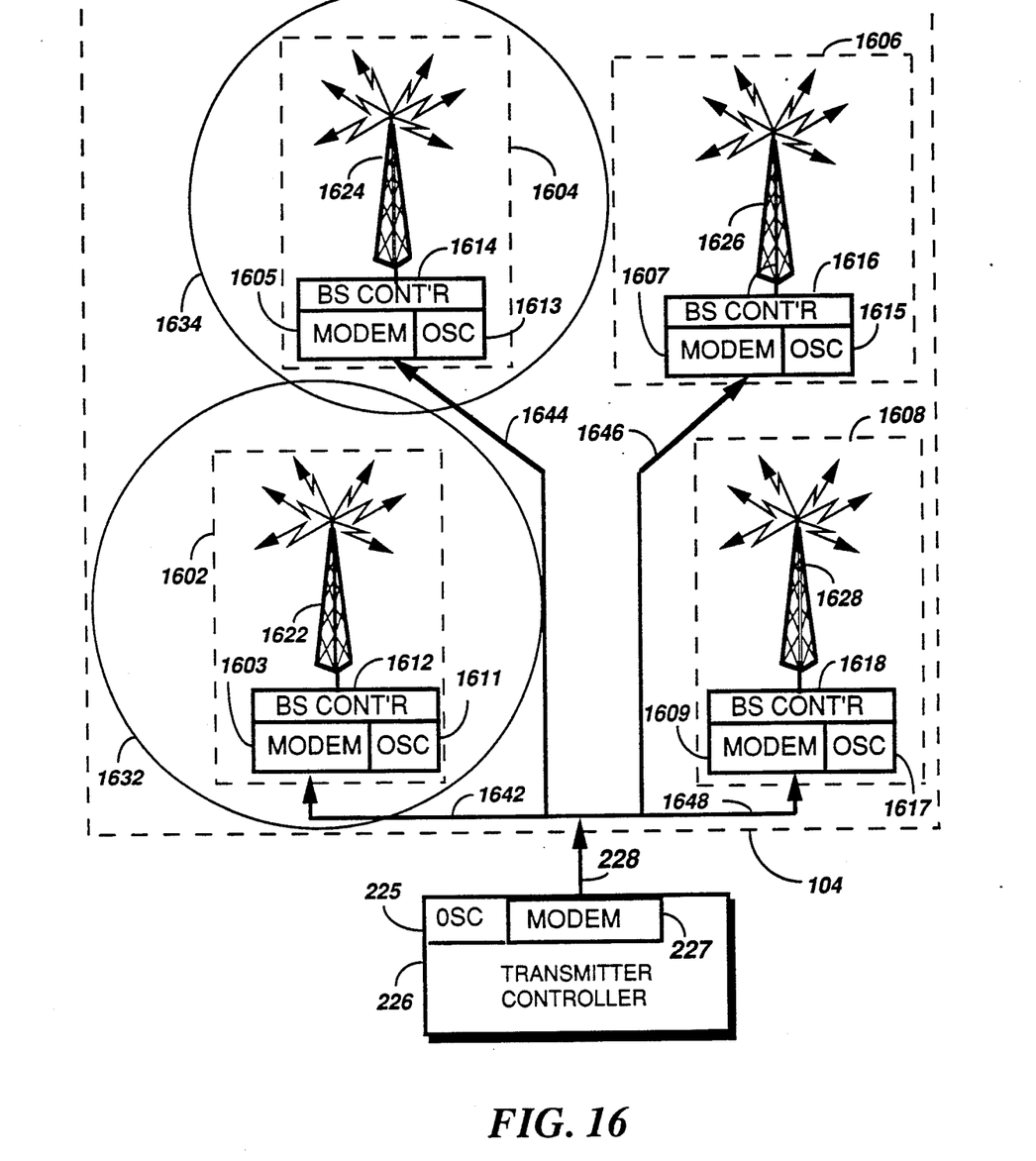
FIG. 16 is an electrical block diagram of a simulcast system for processing and transmitting information in accordance with the preferred embodiment of the present invention.

FIG. 16 is an electrical block diagram of a simulcast system for processing and transmitting information in accordance with the preferred embodiment of the present invention. In the simulcast system, the transmitter stations 104, shown in FIG. 2, are coupled to a transmitter controller 226. The transmitter controller 226 preferably comprises a high speed modem 227 for transmitting data at a speed faster than the speed of real-time transmission on a narrow band RF channel. It will be appreciated by one of ordinary skill in the art that the high speed modem 227 time compresses the data before transmission to the plurality of base sites 1602, 1604, 1606, 1608 to achieve this high speed transmission. The transmitter controller 226 also includes an oscillator 225 for establishing a time stability or time reference of the transmitter controller 226. A stability factor is usually referred to as N parts-per-million (PPM) or N parts-per-billion (PPB), where N refers to the accuracy of the oscillator as the number of clock cycles. The transmitter controller 226 is coupled by the distribution channel 228 to the plurality of base sites 1602, 1604, 1606, 1608 which are shown only as example. The distribution channel 228 is shown divided into four distributor channels 1642-8 coupled to each of the base sites 1602, 1604, 1606, 1608, respectively. The plurality of base sites 1602, 1604, 1606, 1608 comprise base site controllers 1612, 1614, 1616, 1618 coupled to transmitters 1622-28 which have predefined coverage areas, for example, coverage areas 1632, 1634. The base site controllers 1612, 1614, 1616, 1618 also comprise modems 1603, 1605, 1607, 1609 for receiving the high speed data, and oscillators 1611, 1613, 1615, 1617 for establishing a time stability in the plurality of base sites 1602, 1604, 1606, 1608. The base site controllers 1612, 1614, 1616, 1618 are preferably microcomputers, such as an MC68000 or equivalent, which are manufactured by Motorola Inc., and which run various pre-programmed routines for controlling such base station operations for transmitting and receiving data, or the handshaking protocol for maintaining synchronization to enable the retransmission of the data at a predetermined time as will be discussed below.

Figure 17:
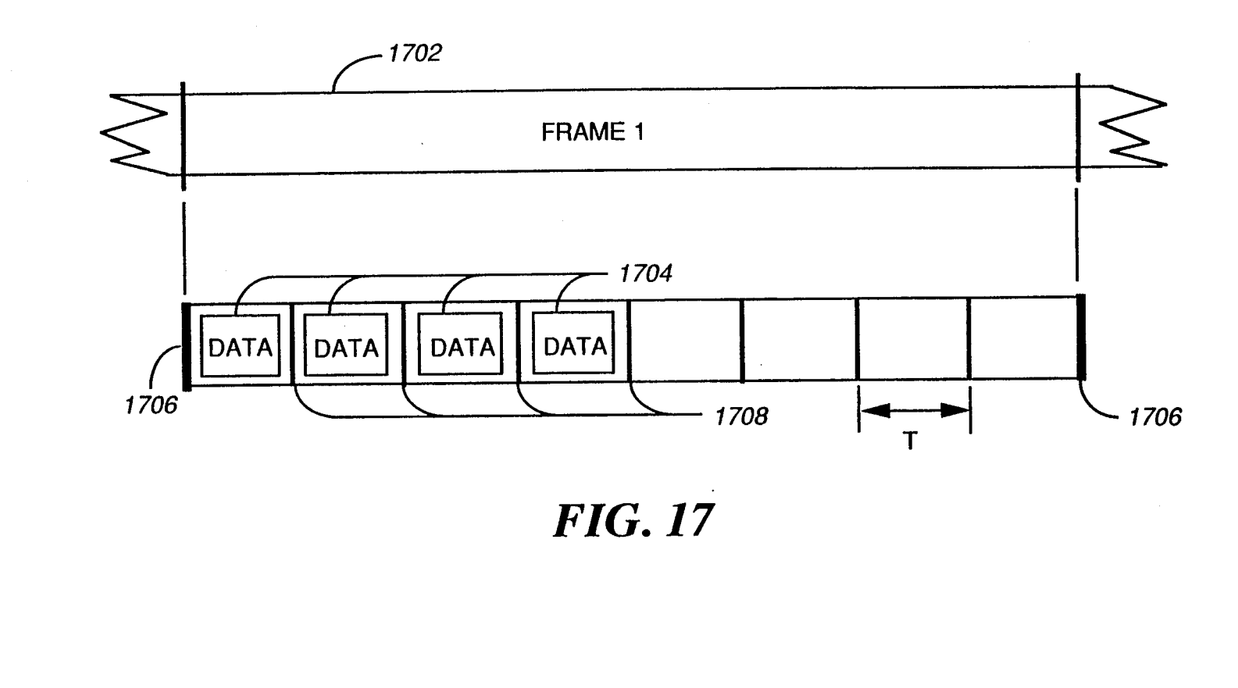
FIG. 17 is a timing diagram illustrating the transmission format of the signal protocol for maintaining synchronization in accordance with the preferred embodiment of the present invention.

FIG. 17 is a timing diagram illustrating the transmission format of the signal protocol for maintaining synchronization in accordance with the preferred embodiment of the present invention. The timing diagram shows a frame (Frame 1) of uncompressed data 1702. The transmitter controller generates time marks 1708 which are separated by a predetermined time period (T) calculated to produce a minimum resolution for an allowable time drift. As discussed above in FIG. 16, the transmitter controller and the plurality of base sites have oscillators with known accuracy.

Establishing the allowable time drift of the simulcast system (minimum resolution):

$DTc$ = time drift at the transmitter controller having an oscillator clock accuracy of $PPMc$;
$DTb$ = time drift at the plurality of base site controllers having an oscillator clock accuracy of $PPMb$;
$T$ = predetermined time period between time marks;
$Ta$ = the allowable time drift for the simulcast system (minimum resolution). Thus $$Ta = DTc + DTb, \text{ for each base site;}$$

where
$DTc = PPMc \times Tc$, and
$DTb = PPMb \times Tb$.
Therefore:

$$Ta = T \times (PPMc + PPMb).$$

Adjusting the predetermined time period for the Nth base site where:
$PDm(N)$ = propagation delay measured or predetermined time period;
$TMe(N)$ = estimated predetermined time delay;
$TMm(N)$ = measured time period between time marks.
Then the adjustment factor is determined as Delta, by the following equation:
$Delta = TMe(N) - TMm$; and the new delay time becomes
$PDm(N) = PDm(N) - (Delta)$.

Thus, PDm(N) is the adjusted time period for delaying the retransmission of the data to maintain simulcast retransmission by the plurality of base sites.

Selecting the predetermined time period between time marks, for example, T=1 second, the accuracy of the transmitter oscillator, $PPMc = 30 \times 10 - 9$, and the accuracy of the base site oscillator, $PPMb = 10 - 7$ results in a minimum resolution, $Ta = 10 - 7$ seconds. As illustrated, the accuracy of the oscillator in the transmitter controller is approximately one hundred times more accurate than the oscillators of the plurality of base sites. This is more desirous in view of the number of oscillators required for each base site within the system and the exorbitant cost of high accuracy oscillators.

Thus, after establishing the predetermined time periods, T, between time marks, the time marks 1708 are periodically generated and the base sites, upon receipt of consecutive pairs of time marks 1708, measures the time pairs of time marks to determine when there are drifts in time from the transmitter controller to each of the plurality of base sites which is indicated as a difference in the predetermined time period, T. The data is sub-divided into packets 1704, which after time compression, are interposed between one or more successive pairs of time marks 1708. The initial or first time mark 1706 designates the start command for initiating the retransmission of the data by the plurality of base sites.

Figure 18:
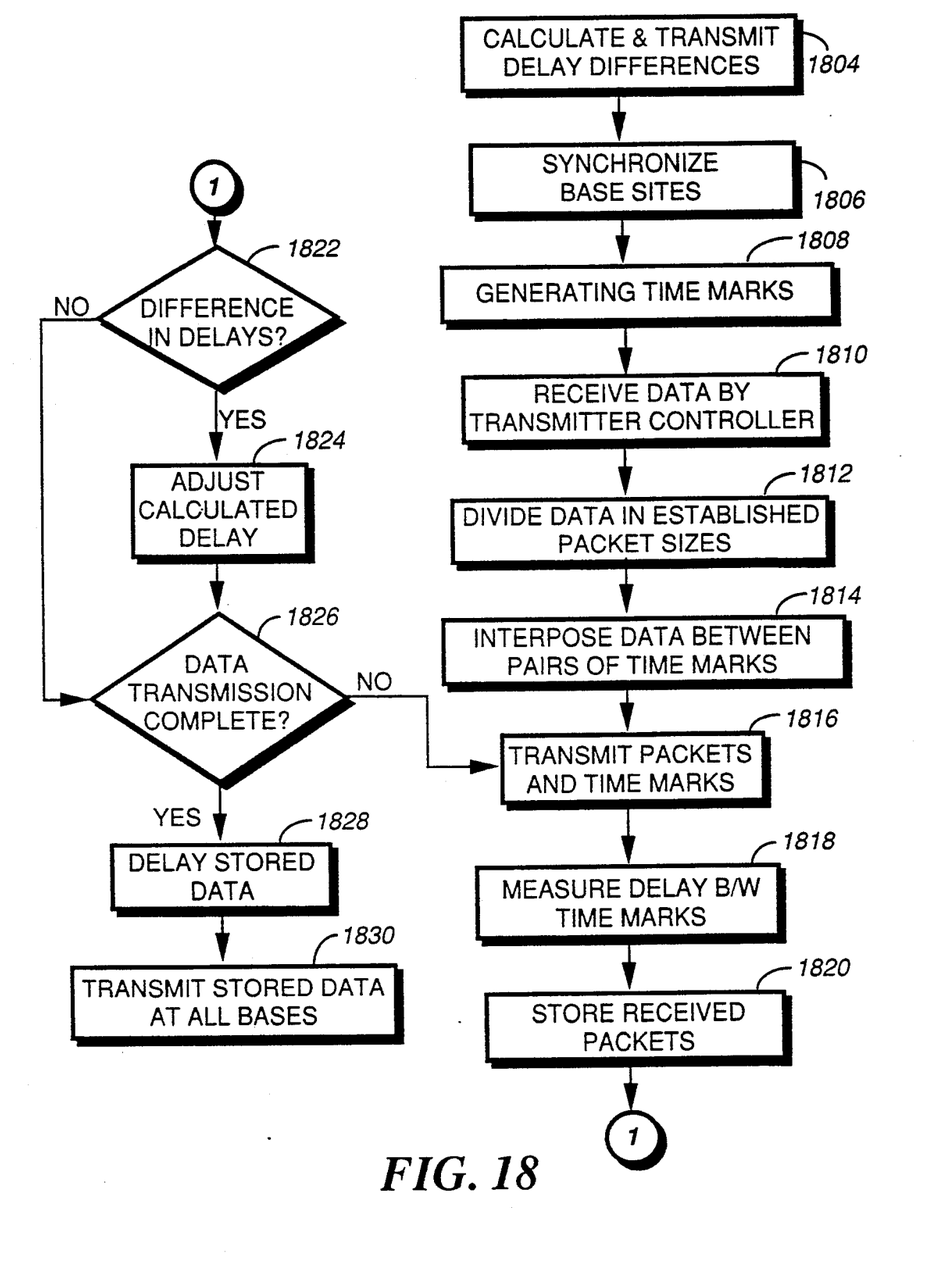
FIG. 18 is a flow diagram illustrating the sequence for maintaining synchronization of the plurality of base sites in accordance with the preferred embodiment of the present invention.

FIG. 18 is a flow diagram illustrating the sequence for maintaining synchronization of the plurality of base sites in accordance with the preferred embodiment of the present invention. The plurality of propagation delays are measured for the plurality of base sites, step 1804. Subsequent to measuring the propagation delays, the plurality of base sites are synchronized to the transmitter controller, step 1806. The synchronization must be maintained, preferably in the least disruptive way to the normal operation of the simulcast system (e.g., for receiving and transmitting data) to maintain simulcast transmission of data by the plurality of base sites. The transmitter controller generates time marks separated by a predetermined time period determined to produce a desired resolution for determined variations in the time between transmission of data at the transmitter controller and reception at each of the plurality of base sites. The time marks are periodically generated, 1808. When the transmitter controller receives data to be transmitted to the plurality of base sites, step 1810, the data is divided into a plurality of preset (or predetermined) packets, step 1812, and the packets are interposed between at least two (a pair) of time marks, step 1814. After the packets of data have been interposed between time marks, the packets and the time marks are then transmitted consecutively and continually, step 1816. The plurality of base sites receive the data packets and from the receipt of a prior time mark to a presently received time mark, the delay time between each pair of time mark is determined or measured, step 1818. Therefore, since the time between the receipt of each pair of time marks are known, T, then any difference between successive pairs of time marks are generally caused by variations in the link between the transmitter controller and the base site or drifts caused by the oscillators in the transmitter controller and the base sites. The variation in delay time is also tracked, step 1818 which is preferably achieved by averaging the variation in time between pairs of time marks. The data, upon receipt, is stored at the respective base site, and the delay between pairs of time marks is determined and also stored, step 1820. The delay between a pair of time marks is compared with the current established or known delay time period, T, that is preferably stored in memory, step 1822. When the delays are different, the base site adjusts the propagation delay difference or recomputes a new propagation delay difference for ensuring that the plurality of base sites remain synchronized, step 1824. When the delays are the same, step 1826 determines when all the packets are received (i.e., when all the data is transmitted and stored by the plurality of base sites). When data transmission is incomplete, the data transmission continues from step 1816. Alternatively, when data transmission is complete, the transmitter controller continues transmitting time mark since the compressed data is sufficiently shorter than the uncompressed data. The base site continues to receive the time marks until the base site receives the special time mark (start command) 1706 which initiates the retransmission of the data after the appropriate delay at respective base sites, step 1828. After the expiration of the delay, the plurality of base sites retransmit the data (step 1830) which results in simulcast transmission by the plurality of base sites.

In summary, the synchronization of data transmissions in the simulcast system is maintained by: (a) generating time marks at a predetermined time period; (b) dividing the data into predetermined packets to be interposed between at least a pair of time marks; (c) transmitting the data packets and time marks to the plurality of base sites; (d) periodically transmitting the data packets including the time marks to the plurality of base sites for determining variations in time to the plurality of base sites; (e) receiving the data packets and time marks by the plurality of base sites; (f) measuring the time between each consecutive pair of time marks; (g) determining when there are variations in time between any pairs of time marks and the predetermined time period; and (h) adjusting the difference in propagation delay of the respective base sites responsive to step (g) to compensate for variations in the propagation delays to the plurality of base sites.

Therefore, by subdividing the data into smaller packets which are interposed between pairs of time marks, the elapsed time between each pair of packets are measured and compared with a known time period, and when there is a difference between the known time period and the measured elapsed time, a delay time stored at each base sites is adjusted to reflect changes or variations in the elapse time between each pair of time marks. In this way, more frequent measurements are made to ensure that the variations or drift in oscillators in the link between any base site and the transmitter controller are reflected in the delay time to ensure simulcast retransmission of the data at the plurality of base sites. Additionally, because these measurements and adjustments are made during normal operations of the simulcast transmission system, the system does not have to devote time that otherwise would used for data transmission to resynchronize the plurality of base sites.

I claim:

1. A simulcast system having a transmitter controller capable of synchronizing and maintaining synchronization of a plurality of base sites coupled to the transmitter controller, the plurality of base sites having transmitters capable of transmitting data as radio frequency transmission at substantially the same time, said transmitter controller comprising:

means for generating time marks at predetermined time periods;

means, coupled to the means for generating, for dividing the data into predetermined packets to be interposed between at least a pair of time marks;

means, coupled to the means for dividing, for transmitting the data packets and time marks to the plurality of base sites; the base sites comprising:

means for receiving the data packets and time marks;

means, coupled to the means for receiving, for measuring the time between pairs of time marks;

means, coupled to the means for measuring, for determining when there are variations in time between pairs of time marks and the predetermined time periods;

means, coupled to the means for determining, for adjusting a delay time at each of the plurality of base sites in response to variation in time between time marks at the corresponding base site; and means, coupled to the means for adjusting, for delaying retransmission of data from a receipt of a start command by a predetermined delay time determined for each of the plurality of base sites to enable a retransmission of data at substantially the same time by the plurality of base sites.

2. The simulcast system according to claim 1 wherein the means for transmitting the data comprises a modem capable transmitting the data at a speed faster than the transmission speed capable on a narrow band radio frequency channel.

3. The simulcast system according to claim 2 wherein the modem time-compresses the data before transmitting the data to the plurality of base sites and the plurality of base sites further including modems for decompressing the time-compressed received data.

4. The simulcast system according to claim 1 wherein the transmitting means includes a means for sorting a plurality of delay times to ensure that each of the plurality of base sites receives the delay time calculated for that base site.

5. The simulcast system according to claim 1 wherein a first time mark comprises a start-to-receive command for receiving data packets and a final time mark comprises the start command for initiating simulcast data transmission at the plurality of base sites.

6. The simulcast system according to claim 1 wherein a start-to-receive and the start command comprise predetermined time marks.

7. The simulcast system according to claim 1 wherein the transmitter controller comprises means for interposing the data packets between pairs of time marks.

8. The simulcast system according to claim 1 further comprising a means, coupled to the means for transmitting, for signifying when the last data packet is being transmitted to the plurality of base sites.

9. A simulcast system having a transmitter controller capable of synchronizing and maintaining synchronization of a plurality of base sites coupled to the transmitter controller, the plurality of base sites having transmitters capable of transmitting data as radio frequency transmission at substantially the same time, said transmitter controller comprising:

generator for generating time marks at predetermined time periods;

data divider, coupled to the generator, for dividing the data into predetermined packets to be interposed between at least a pair of time marks;

transmitter, coupled to the data divider, for transmitting the data packets and time marks to the plurality of base sites; the base sites comprising:

base site receivers for receiving the data packets and time marks;

clocks, coupled to the base site receivers, for measuring the time between pairs of time marks;

base sites controller, coupled to the clocks, for determining when there are variations in time between any pairs of time marks and the predetermined time periods;

timer, coupled to the base sites controller, for adjusting a delay time at each of the plurality of base sites in response to a variation in time between time marks at the corresponding base site; and said timer for delaying retransmission of data from a receipt of a start command by a predetermined delay time determined for each of the plurality of base sites to enable a retransmission of data at substantially the same time by the plurality of base sites.

10. A method for maintaining synchronization of data transmissions in a simulcast system, the simulcast system having a transmitter controller capable of synchronizing and maintaining synchronization of a plurality of base sites coupled to the transmitter controller, the plurality of base sites having transmitters capable of transmitting data as radio frequency transmission at substantially the same time, said method comprising the steps of:

(a) generating time marks at a predetermined time periods;

(b) dividing the data into predetermined packets to be interposed between at least a pair of time marks;

(c) transmitting the data packets and time marks to the plurality of base sites;

(d) periodically transmitting the data packets including the time marks to the plurality of base sites for determining variations in time to the plurality of base sites;

(e) receiving the data packets and time marks by the plurality of base sites;

(f) measuring the time between each consecutive pair of time marks;

(g) determining when there are variations in time between pairs of time marks and the predetermined time period; and (h) adjusting for the difference in propagation delay of the respective base sites responsive to step (g) to compensate for variations in the propagation delays to the plurality of base sites.

11. The method for maintaining synchronization according to claim 10 further including the step of delaying retransmission of data from the receipt of a start command by a predetermined delay time determined for each of the plurality of base sites to enable the retransmission of data at substantially the same time by the plurality of base sites.

12. The method for maintaining synchronization according to claim 10 wherein the step of transmitting transmits the data at a speed faster than the transmission speed capable on a narrow band radio frequency channel.

13. The method for maintaining synchronization according to claim 10 further comprises a step of compressing the data before transmitting to the plurality of base sites and the step of decompressing the received data at the plurality of base sites.

14. The method for maintaining synchronization according to claim 10 wherein the step of transmitting including a step of sorting a plurality of delay time to ensure that each of the plurality of base sites receives the delay time calculated for that base site.

15. The method for maintaining synchronization according to claim 10 wherein the step of transmitting transmits a first time marks a start-to-receive command for receiving data packets and a final time mark as a start command for initiating simulcast data transmission at the plurality of base sites.

16. The method for maintaining synchronization according to claim 10 wherein the step of determining further includes the step of averaging the delay time for adjusting the difference in time variations between pairs of time marks.

17. The method for maintaining synchronization according to claim 16 wherein the step of averaging includes the step of tracking the difference in time variations between pairs of time marks.

* * * * *